United States Patent
Zurfluh et al.

(10) Patent No.: US 10,082,103 B2
(45) Date of Patent: Sep. 25, 2018

(54) METHOD OF MAKING ENGINE SPACER PLATE GASKET

(71) Applicant: FEDERAL-MOGUL CORPORATION, Southfield, MI (US)

(72) Inventors: Thomas Olin Zurfluh, Evanston, IL (US); Daniel Joseph Orozco, Streamwood, IL (US); Wilford Dean Virgin, Spring Grove, IL (US)

(73) Assignee: Federal-Mogul LLC, Southfield, MI (US)

( * ) Notice: Subject to any disclaimer, the term of this patent is extended or adjusted under 35 U.S.C. 154(b) by 69 days.

(21) Appl. No.: 15/249,745

(22) Filed: Aug. 29, 2016

(65) Prior Publication Data

US 2017/0051704 A1    Feb. 23, 2017

Related U.S. Application Data

(62) Division of application No. 14/215,796, filed on Mar. 17, 2014, now Pat. No. 9,441,574.
(Continued)

(51) Int. Cl.
*F02F 11/00* (2006.01)
*F16J 15/08* (2006.01)
(Continued)

(52) U.S. Cl.
CPC ...... *F02F 11/002* (2013.01); *B29C 45/14336* (2013.01); *F16J 15/0818* (2013.01); *F16J 15/122* (2013.01); *F16J 15/123* (2013.01); *B29C 2045/14459* (2013.01); *B29K 2705/00* (2013.01); *B29L 2031/26* (2013.01); *F02F 2200/00* (2013.01); *F16J 2015/0856* (2013.01); *Y10T 29/49297* (2015.01)

(58) Field of Classification Search
CPC .............. F02F 11/002; F02F 2200/00; B29C 45/14336; B29C 2045/14459; F16J 15/123; F16J 15/122; F16J 15/0818; F16J 2015/0856; B29L 2031/26; B29K 2705/00; Y10T 29/49297
See application file for complete search history.

(56) References Cited

U.S. PATENT DOCUMENTS

| 3,448,986 A | 6/1969 | Jelinek et al. |
| 4,548,165 A | 10/1985 | Vorobiev et al. |

(Continued)

FOREIGN PATENT DOCUMENTS

| CN | 1156797 A | 8/1997 |
| CN | 2924191 Y | 7/2007 |

(Continued)

*Primary Examiner* — Ryan J Walters
(74) *Attorney, Agent, or Firm* — Robert L. Stearns; Dickinson Wright, PLLC

(57) ABSTRACT

A sealing assembly for establishing a gas and fluid tight seal in an internal combustion engine is provided. The sealing assembly includes a plate of metal which has a plurality of openings and at least one generally flat surface. The plate also has at least one shelf which circumferentially surrounds one of the openings and which opens to the generally flat surface and the opening. The sealing assembly further includes at least one sealing bead of an elastically compressible material which is engaged with the shelf and extends outwardly therefrom past the generally flat surface for sealing the plate with another component in the internal combustion engine.

4 Claims, 4 Drawing Sheets

Related U.S. Application Data

(60) Provisional application No. 61/798,624, filed on Mar. 15, 2013.

(51) Int. Cl.
| | | |
|---|---|---|
| *F16J 15/12* | (2006.01) | |
| *B29C 45/14* | (2006.01) | |
| B29K 705/00 | (2006.01) | |
| B29L 31/26 | (2006.01) | |

(56) References Cited

U.S. PATENT DOCUMENTS

| | | |
|---|---|---|
| 5,338,046 A | 8/1994 | Willis, Jr. et al. |
| 5,505,466 A | 4/1996 | Willis et al. |
| 2008/0093808 A1 | 4/2008 | Quick et al. |
| 2009/0200751 A1 | 8/2009 | Widmann |
| 2010/0032909 A1 | 2/2010 | Beyer |

FOREIGN PATENT DOCUMENTS

| | | |
|---|---|---|
| CN | 102257300 A | 11/2011 |
| DE | 4414961 A1 | 11/1994 |
| JP | S5222805 U | 2/1977 |
| JP | S5735620 Y2 | 8/1982 |
| JP | H0710622 U | 2/1995 |
| JP | H07305771 A | 11/1995 |
| JP | H09210204 A | 8/1997 |
| JP | 2000230640 A | 8/2000 |
| JP | 2001200755 A | 7/2001 |
| WO | 2010069408 A1 | 6/2010 |

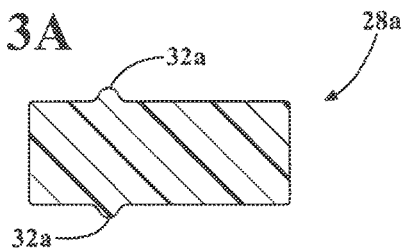
FIG. 3A
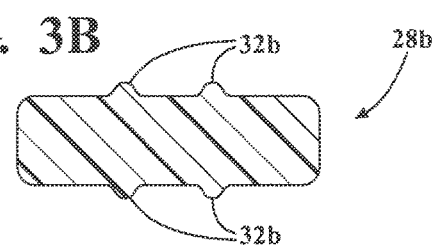
FIG. 3B
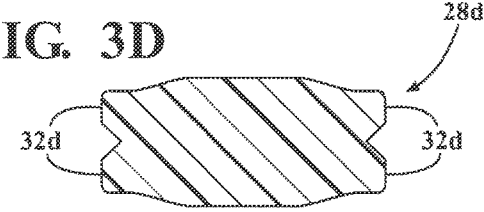
FIG. 3C
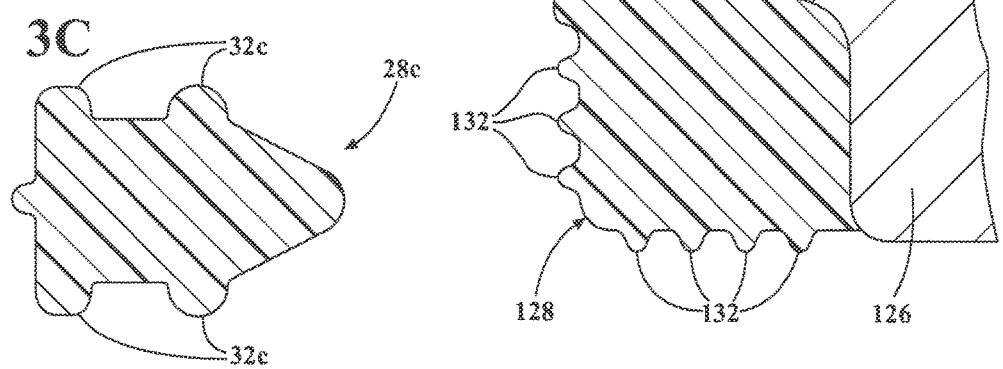
FIG. 4
FIG. 3D
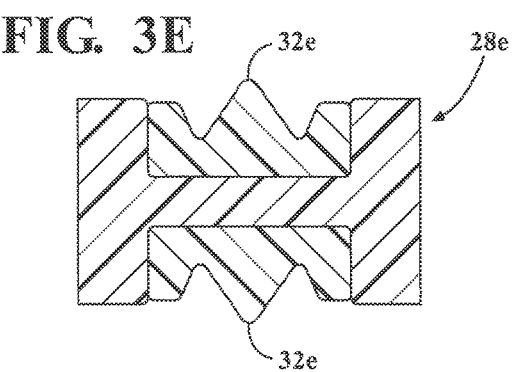
FIG. 3E

METHOD OF MAKING ENGINE SPACER PLATE GASKET

CROSS REFERENCE TO RELATED APPLICATION

This divisional application claims the benefit of U.S. Utility patent application Ser. No. 14/215,796, filed Mar. 17, 2014 and U.S. Provisional Patent Application Ser. No. 61/798,624, filed Mar. 15, 2013, the entire contents of which are incorporated herein by reference in their entirety.

BACKGROUND OF THE INVENTION

1. Field of the Invention

The present invention relates generally to internal combustion engines and more particularly to seals for internal combustion engines.

2. Related Art

FIG. 1 shows a conventional internal combustion engine including an engine block and a cylinder head. The engine block has a cylinder bore for receiving a piston. The cylinder head and engine block also include a plurality of coolant holes for conveying a coolant between the engine block and cylinder head and a plurality of bolt holes for receiving bolts to interconnect the cylinder head with the engine block. An aluminum plate is sandwiched between the cylinder head and engine block and has openings which correspond with and are enlarged relative to the cylinder bore and coolant/bolt holes. The engine also includes a cylinder sleeve, which is typically of a harder material than the engine block and which lines the wall of the cylinder bore. The cylinder sleeve has a flange that extends towards the aluminum plate in the gap between the engine block and the cylinder head.

The engine shown in FIG. 1 also includes a plurality of seals for establishing gas and fluid tight seals between the engine block, cylinder head and cylinder sleeve, One of the seals is a rubber coated sheet of metal which is sandwiched between the engine block and the aluminum plate. Another seal is a rubber grommet with a steel core which circumferentially surrounds the coolant/bolt holes. Yet another seal is a combustion seal for sealing the cylinder sleeve to the aluminum plate and to the cylinder head. The combustion seal has an outer armor piece which is bent to be generally C-shaped with an inner opening, a body disposed within the inner opening and a wire ring also disposed within the opening adjacent the ring body.

The rubber coated sheet seal, the rubber grommet with a steel core and the ring shaped seal are all drop in components which must be manually placed in their respective components of the engine during assembly of the engine.

SUMMARY OF THE INVENTION

One aspect of the present invention includes a sealing assembly for establishing a gas and fluid tight seal in an internal combustion engine. The sealing assembly includes a plate which is made of metal and has a plurality of openings and at least one generally flat surface. The plate has at least one shelf which circumferentially surrounds one of the openings and which opens to the generally flat surface and to one of the openings. At least one sealing bead of an elastically compressible material is engaged with the shelf and extends outwardly therefrom past the at least one generally flat surface of the plate for sealing the plate with another component in the internal combustion engine. This sealing assembly provides certain manufacturing advantages because the engagement between the sealing bead and the shelf of the plate eliminates the need for an additional seal to be added during assembly of the internal combustion engine.

According to another aspect of the present invention, the sealing bead is engaged with the shelf of the plate through an overmolding connection.

According to yet another aspect of the present invention, the plate includes a plurality of shelves, and the sealing assembly further includes a combustion seal which is engaged with one of the shelves and circumferentially surrounds one of the openings. The combustion seal may have an armor piece and a body ring and a wire ring. The combustion seal may be interconnected with the shelf through an elastomeric bead which is interconnected with the plate and with the armor piece through overmolding connections.

According to still another aspect of the present invention, the at least one sealing bead includes at least one rib.

According to a further aspect of the present invention, the plate is of aluminum or an aluminum alloy.

Another aspect of the present invention provides for an internal combustion engine which includes an engine block having a cylinder bore, a cylinder sleeve positioned in the cylinder bore and a cylinder head. A metal plate is sandwiched between the engine block and the cylinder head. The plate has a plurality of openings, at least one generally flat surface and at least one shelf which circumferentially surrounds at least one of the openings and which opens to the generally flat surface and to the opening. At least one sealing bead of an elastically compressible material is engaged with the at least one shelf and extends outwardly therefrom to seal against at least one of the engine block and the cylinder sleeve and the cylinder head.

Still another aspect of the present invention provides for a method of making a sealing assembly for an internal combustion engine. The method includes the step of preparing a plate of metal and having a plurality of openings and at least one generally flat surface. The plate also has at least one shelf which circumferentially surrounds one of the openings and which opens to the generally flat surface and to the opening. The method further includes the step of injection molding an elastically compressible material into an overmolding engagement with the plate at the at least one shelf to form a sealing bead.

Another aspect of the present invention includes the step of preparing a combustion seal and injection molding an elastomeric bead into an overmolding engagement with the combustion seal and at least one shelf of the plate.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIGS. 3a-e are cross-sectional views of various exemplary embodiments of seals for the sealing assembly of FIG. 2;

FIG. 4 is a cross-sectional and fragmentary view of another exemplary embodiment of the sealing assembly;

DESCRIPTION OF THE ENABLING EMBODIMENT

Figure 1:
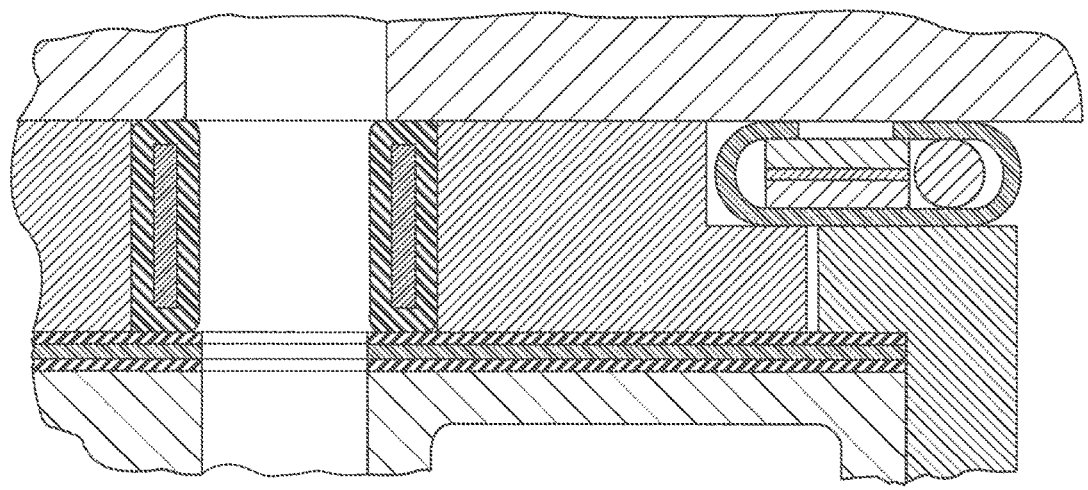
FIG. 1 is a cross-sectional view of a known internal combustion engine.
Figure 2:
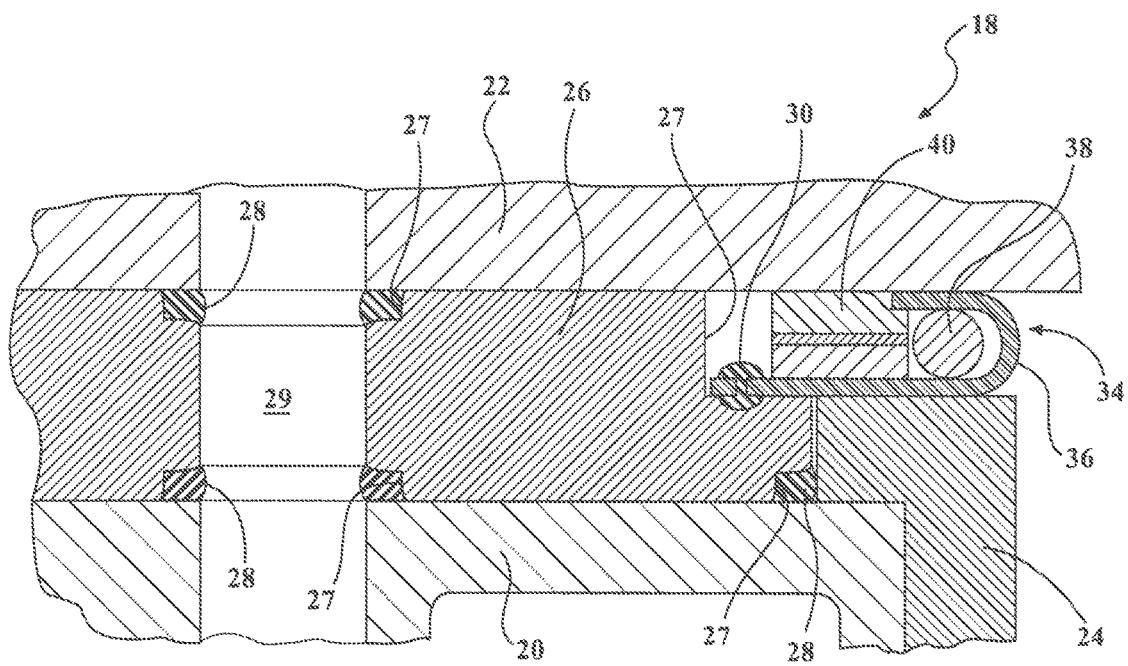
FIG. 2 is a cross-sectional view of a an internal combustion engine including a first exemplary embodiment of a sealing assembly.

Referring to FIG. 2, an aspect of the present invention provides an improved diesel fueled, compression ignition internal combustion engine 18 which includes an engine block 20; a cylinder head 22; a cylinder sleeve 24; and a sealing assembly with a metal plate 26 which is sandwiched between the engine block 20 and the cylinder head 22. The internal combustion engine 18 is improved as compared to similar engines because it offers improved sealing performance without the need for a rubber coated sheet, any steel cored rubber grommets and a combustion seal as are commonly found in other known internal combustion engines of the type. This provides for material savings as well as quicker and more cost efficient assembly of the internal combustion engine. In the exemplary embodiment, the metal plate 26 is made of aluminum or an aluminum alloy and is hereinafter referred to as the "aluminum plate 26". The aluminum plate 26 includes a plurality of openings which correspond with the cylinder bore and with coolant and bolt holes 29 in the engine block 20 and the cylinder head 22.

Referring still to FIG. 2, a first exemplary embodiment of the sealing assembly is generally shown. The aluminum plate 26 includes a plurality of shelves 27 or ledges at the intersections of the aluminum plate 26, the cylinder head 22 and the engine block 20 at the coolant/bolt holes 29 and at the cylinder sleeve 24. Each of the shelves 27 opens to at least two surfaces of the aluminum plate 26, e.g., a top surface and one of the coolant/bolt holes 29. As such, when viewed in cross-section, the aluminum plate 26 has a shelf 27 at each of its corners. Depending on the particular application, the shelves 27 may have similar or differing sizes or configurations.

Beads 28 (hereinafter referred to as "corner beads 28") of an elastically compressible material (such as rubber) are injection molded into engagement with the aluminum plate 26 at the shelves 27. In the exemplary embodiment, the aluminum plate 26 includes elastomeric corner beads 28 at the top and bottom of the coolant/bolt hole 29 and a single corner bead 28 at the intersection of the aluminum plate 26, engine block 20 and cylinder sleeve 24. The corner beads 28 extend substantially circumferentially around the respective ones of the coolant/bolt holes 29 and cylinder sleeve for establishing gas and fluid tight seals between the aluminum plate 26 and the various components to which they are engaged. For example, one of the corner beads 28 establishes a gas and fluid tight seal between the aluminum plates, the engine block 20 and the cylinder sleeve 24. Another corner bead 28 establishes the gas and fluid tight seal between the aluminum plate 26 and the engine block 20. Still another corner bead 28 establishes the gas and fluid tight seal between the aluminum plate 26 and the cylinder head 22. The corner beads 28 are preferably connected with the aluminum plate 26 through an injection molding process. This may allow for quicker and/or simpler assembly of the internal combustion engine because the steps of dropping in the rubber coated sheet and the steel cored rubber molded grommets are not required. Additionally, because the corner beads 28 are connected with the aluminum plate 26 before assembly of the engine 18, the risk of an assembly worker forgetting any of the drop in seals found in other known engines is eliminated. The corner beads 28 may be formed of any suitable elastically compressible sealing material including, for example, synthetic or natural rubbers.

FIGS. 3*a-e* show various exemplary embodiments of the elastomeric corner beads 28*a-e*. Each of these embodiments includes one or more raised ridges 32*a-e*, ribs or other features which may have the effect of reducing the risk of the bead cracking when put under compression, thereby improving the durability and life span of the seal provided. The ribs 32*a-e* are preferably formed into the corner beads 28*a-e* during the injection molding process. In the exemplary embodiment of FIG. 3*a*, the corner bead 28*a* includes a pair of ridges 32*a* which extend in opposite axial directions. In the exemplary embodiment of FIG. 3*b*, the corner bead 28*b* includes two ridges 32*b* which extend in one axial direction and two ridges 32*b* which extend in an opposite axial direction. In the exemplary embodiment of FIG. 3*c*, the corner bead 28*c* includes two ridges 32*c* which extend in one axial direction, two ridges 32*c* which extend in an opposite axial direction, one ridge 32*c* which extends radially inwardly and one ridge 32*c* which extends radially outwardly. In the exemplary embodiment of FIG. 3*d*, the corner bead 28*d* includes two ridges 32*d* which extend raxially inwardly and two ridges 32*d* which extend radially outwardly. In the exemplary embodiment of FIG. 3*e*, each axial side of the corner bead 28*e* includes an axially extending peak 32*e* with a pair of valleys on either radial side thereof.

Referring now to FIG. 4 wherein like numerals, separated by a factor of 100, indicate corresponding parts with the above-described embodiments, yet another embodiment of the corner bead 128 is shown. In this exemplary embodiment, the corner bead 128 has generally smooth surfaces in engagement with the aluminum plate 26 and a plurality of spaced apart ribs 132 which face away from the aluminum plate 126. The ribs 132 may provide for improved sealing between the aluminum plate 126 and the other component to which it is sealed, e.g., the cylinder head, the cylinder sleeve or the engine block.

Referring back to the first exemplary embodiment shown in FIG. 2, the internal combustion engine 18 additionally includes a combustion seal 34 which is sandwiched between an upper surface of the cylinder sleeve 24 and the cylinder head 22 to establish a gas and fluid tight seal between the cylinder sleeve 24 and the cylinder head 22, thereby trapping fuel and combustion gasses in the cylinder bore. The exemplary combustion seal 34 has an armor piece 36 with a J-shape that has a long leg and a short leg which are spaced from one another by a groove. A wire ring 38 and a fiber-metal-fiber body ring 40 are at least partially disposed within the groove of the J-shaped armor piece 36. The J-shaped armor piece 36 is interconnected with the aluminum plate 26 by an elastomeric bead 30 which extends through an aperture in the long leg of the J-shaped armor piece 36 and into a groove on the aluminum plate 26 to provide an overmolding connection between the aluminum plate 26 and the combustion seal 34. The elastomeric bead 30 may be injection molded into the groove on the aluminum plate 26 and through the aperture in the armor piece 36 before the aluminum plate 26 is inserted into the engine 18 to provide for easier assembly of the engine 18.

Figure 5:
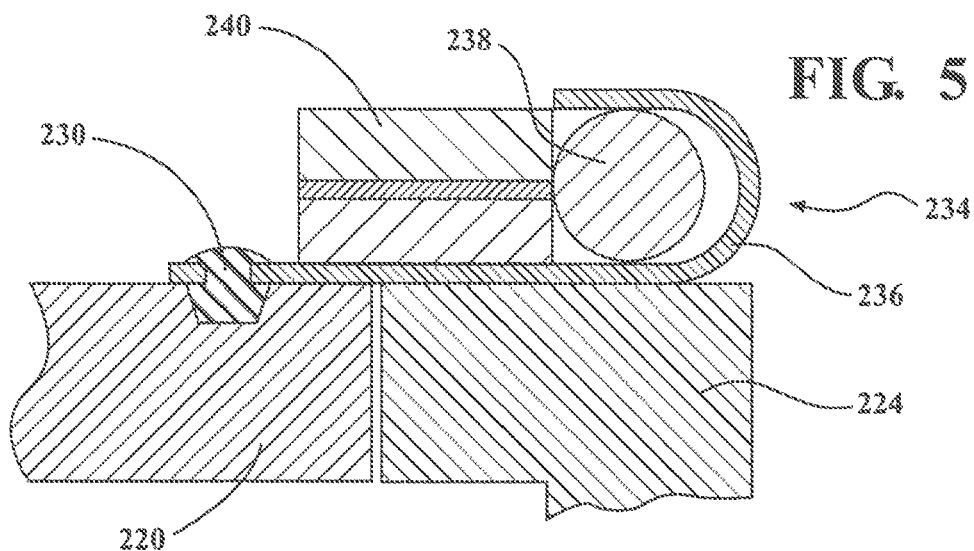
FIG. 5 is a cross-sectional and fragmentary view of yet another exemplary embodiment of the sealing assembly.

Referring now to FIG. 5, with like numerals separated by a factor of 200 identifying corresponding parts with the above-described embodiments, another exemplary embodiment of the combustion seal 234 is generally shown. In this embodiment, the aluminum plate 226 is generally rectangular with a flat top surface and a flat bottom surface, and the J-shaped armor piece 236 of the combustion seal 234 is engaged with the flat top surface with an elastomeric bead 230 which is overmolded into engagement with a groove in the flat top surface of the aluminum plate 226.

Figure 6:
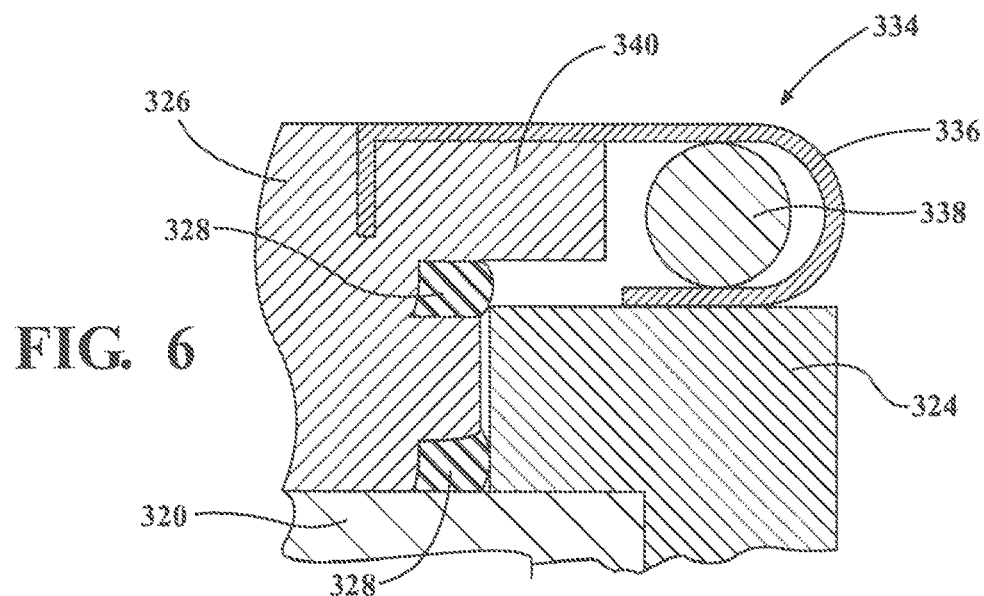
FIG. 6 is a cross-sectional and fragmentary view of still another exemplary embodiment of the sealing assembly.

Referring now to FIG. 6, with like numerals separated by a factor of 300 indicating corresponding parts with the above-described embodiments, yet another exemplary embodiment of the combustion seal 334 is generally shown. This embodiment is similar to the embodiment of FIG. 5, but the long leg of the J-shaped armor piece 336 is disposed vertically above the short leg. An elastomeric bead 330 is sealed between the body of the combustion seal 334 and the cylinder sleeve 324, and a corner bead 328 is disposed at the intersection of the aluminum plate 326, the cylinder sleeve 324 and the engine block 320.

Figure 7:
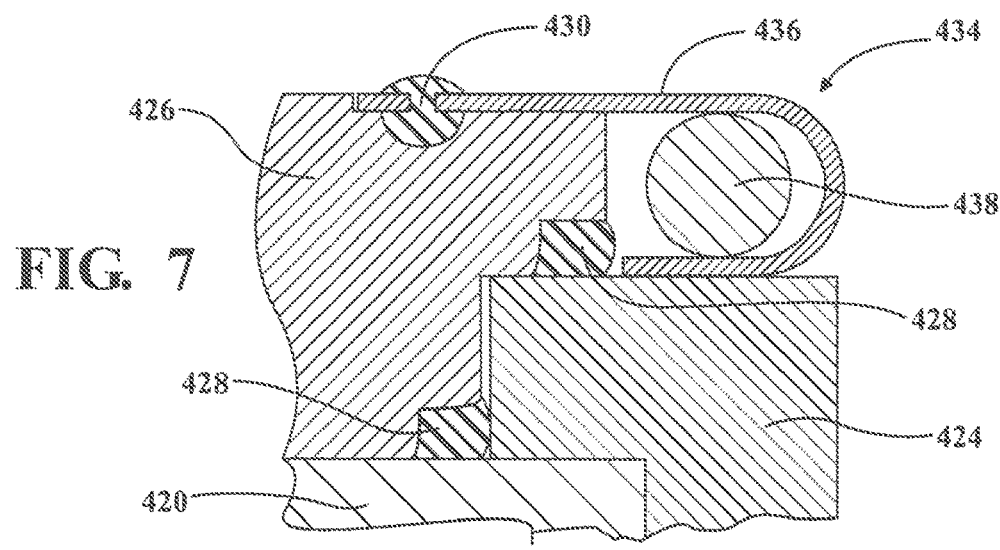
FIG. 7 is a cross-sectional and fragmentary view of a further exemplary embodiment of the sealing assembly.

Referring now to FIG. 7, with like numerals separated by a factor of 400 indicating corresponding parts with the above-described embodiments, still another exemplary embodiment of the combustion seal 434 is generally shown. This exemplary embodiment is similar to the embodiment shown in FIG. 6 but the armor piece 436 is overmolded into engagement with the aluminum plate 426 through an elastomeric bead 430. Additionally, in this embodiment, the combustion seal 434 lacks the body ring found in the other embodiments discussed above. This may provide for additional cost savings.

Figure 8:
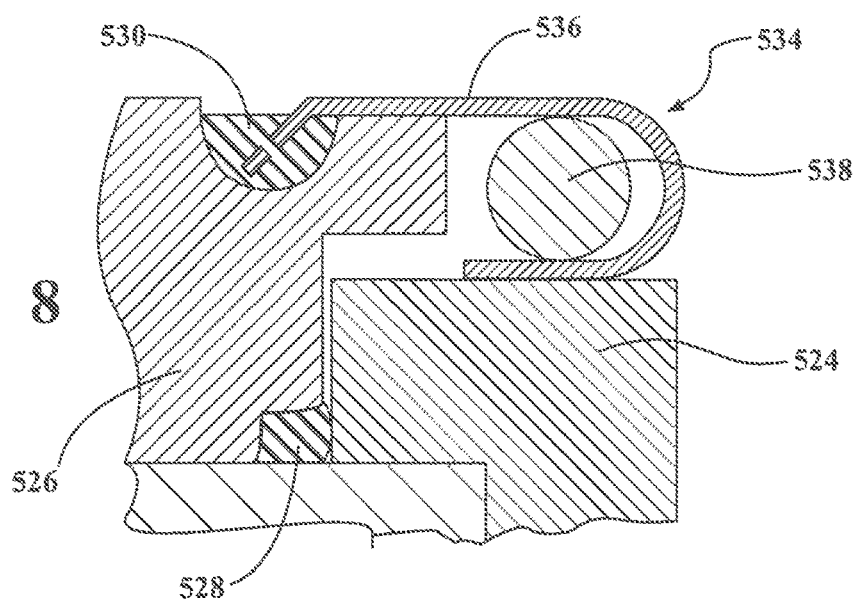
FIG. 8 is a cross-sectional and fragmentary view of yet a further exemplary embodiment of the sealing assembly.

Referring now to FIG. 8, with like numerals separated by a factor of 500 indicating corresponding parts with the above-described embodiments, another exemplary embodiment of the combustion seal 534 is generally shown. This exemplary embodiment is similar to the embodiment of FIG. 7, but the long leg of the armor piece 536 is bent at a downwardly extending slope into the groove on the aluminum plate 526. This may assist in restricting the armor piece 536 from extending radially past the cylinder sleeve 524 and into the combustion chamber of the engine.

Figure 9:
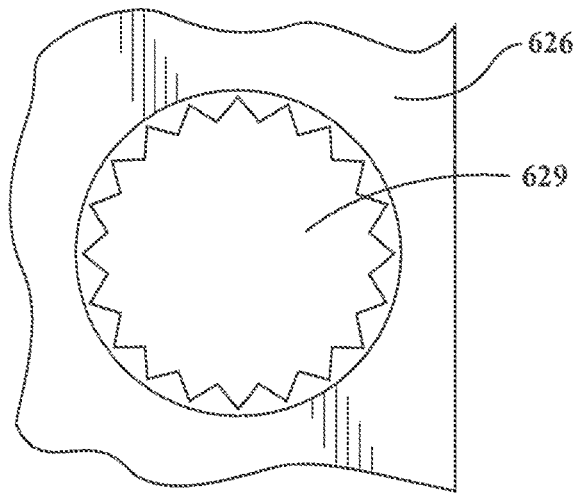
FIG. 9 is a cross-sectional and fragmentary view of another exemplary embodiment of the sealing assembly.

Still another exemplary embodiment of the internal combustion engine is generally shown in FIG. 9 with like numerals separated by a factor of 600 indicating corresponding parts with the above-described embodiments. In this exemplary embodiment, the bolt holes 629 in the aluminum plate 626 are ribbed or generally star shaped as viewed from above to assist in locating the bolts and provide for easier assembly of the engine.

Figure 10:
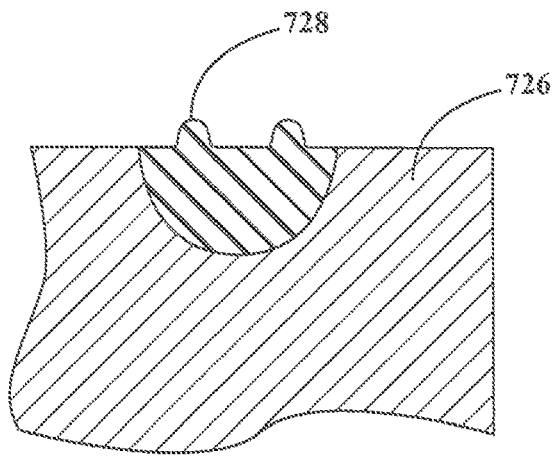
FIG. 10 is a cross-sectional and fragmentary view of yet another exemplary embodiment of the sealing assembly.

Yet a further exemplary embodiment of the internal combustion engine is generally shown in FIG. 10 with like numerals separated by a factor of 700 indicating corresponding parts with the above-described embodiments. In this exemplary embodiment, the beads 728 are spaced radially from the bolt hole 729 and are disposed in grooves on the aluminum plate 726.

Obviously, many modifications and variations of the present invention are possible in light of the above teachings and may be practiced otherwise than as specifically described while within the scope of the appended claims.

What is claimed is:

1. A method of making a sealing assembly for an internal combustion engine, comprising the steps of:
   preparing a plate made of metal and having an exposed inner periphery which surrounds an axially extending coolant or bolt opening and at least one generally flat surface and at least one shelf including a first shelf which circumferentially surrounds the coolant or bolt opening and which relative to the at least one generally flat surface; and
   injection molding an elastically compressible material into an overmolding engagement with the first shelf in the axial direction past the at least one generally flat surface to form a sealing bead wherein the sealing bead extends axially past the generally flat surface radially outwardly of the exposed inner periphery for minimizing intrusion of the sealing bead into the coolant or bolt opening.

2. The method as set forth in claim 1 wherein the elastically compressible material is an elastomeric material.

3. The method as set forth in claim 1 wherein the at least one shelf of the plate includes a plurality of shelves and further the steps of preparing a combustion seal and injection molding an elastomeric bead into an overmolding engagement with the combustion seal.

4. The method as set forth in claim 3 wherein the combustion seal includes an armor piece and wherein the step of injection molding the elastomeric bead into the overmolding engagement with the combustion seal is further defined as injection molding the elastomeric bead into an overmolding engagement with the armor piece.

* * * * *

UNITED STATES PATENT AND TRADEMARK OFFICE
CERTIFICATE OF CORRECTION

Page 1 of 1

PATENT NO. : 10,082,103 B2
APPLICATION NO. : 15/249745
DATED : September 25, 2018
INVENTOR(S) : Thomas Olin Xurfluh et al.

It is certified that error appears in the above-identified patent and that said Letters Patent is hereby corrected as shown below:

In the Specification

Delete "sleeve, One" located on Line 37 of Column 1.
Insert --sleeve. One-- located on Line 37 of Column 1.

In the Claims

Delete "is recessed in an axial direction" located in independent Claim 1 on Line 25 of Column 6.
Insert --which is recessed in an axial direction relative-- in independent Claim 1 on Line 25 of Column 6.

Signed and Sealed this
Fourth Day of June, 2019

Andrei Iancu
*Director of the United States Patent and Trademark Office*